United States Patent [19]
Dunne

[11] Patent Number: 5,539,513
[45] Date of Patent: Jul. 23, 1996

[54] SYSTEM AND ASSOCIATED METHOD FOR DETERMINING AND TRANSMITTING POSITIONAL DATA UTILIZING OPTICAL SIGNALS

[75] Inventor: Jeremy G. Dunne, Littleton, Colo.

[73] Assignee: Laser Technology, Inc., Englewood, Colo.

[21] Appl. No.: 290,216

[22] Filed: Aug. 15, 1994

[51] Int. Cl.$^6$ .................................................. G01C 3/08
[52] U.S. Cl. ...................... 356/5.01; 359/154; 359/186; 359/189
[58] Field of Search .................... 356/5.01; 359/184, 359/154, 159, 181, 186

[56] References Cited

U.S. PATENT DOCUMENTS

| | | | |
|---|---|---|---|
| 3,727,061 | 8/1971 | Dworkin | 250/199 |
| 4,584,720 | 4/1986 | Garrett | 455/608 |
| 4,648,133 | 3/1987 | Vilnrotter | 455/608 |
| 5,291,262 | 3/1994 | Dunne | 356/5 |
| 5,408,351 | 4/1995 | Huang | 359/186 |

OTHER PUBLICATIONS

Hydro I fully Automated Range Azimuth Surveying System by International Measurement and Control Company, copyright 1994 or earlier.

Hydro II Poratable Hydrographic Survey System by Laser Technology, Inc., copyright 1994 or earlier.

*Primary Examiner*—Mark Hellner
*Attorney, Agent, or Firm*—Robert H. Kelly; William J. Kubida; Holland & Hart

[57] ABSTRACT

A system including a laser survey instrument for determining positional data of a selected target. The laser survey instrument generates optical pulses which are transmitted to and reflected from the selected target back to the survey instrument. The survey instrument determines the range to the selected target responsive to the transmission and reflection of the optical pulses. The survey instrument also determines horizontal and vertical angles between the survey instrument and the selected target. Values of the range and the horizontal and vertical angles form positional data. Once determined, the positional data is modulated upon the optical pulses to form an optical signal which is transmitted to a remote site. When the selected target is positioned at the remote site, the same optical pulses which are used to determine positional data are utilized to form the optical signal for transmission of the positional data, and the optical pulses can be utilized simultaneously in the determination of positional data and in the transmission of data to the selected target.

20 Claims, 7 Drawing Sheets

SYSTEM AND ASSOCIATED METHOD FOR DETERMINING AND TRANSMITTING POSITIONAL DATA UTILIZING OPTICAL SIGNALS

CROSS-REFERENCE TO RELATED APPLICATIONS

The present invention is related to application Ser. No. 08/121,363, filed Sep. 14, 1993, entitled APPARATUS AND METHOD FOR MOUNTING A RANGE FINDING INSTRUMENT TO THEODOLITE TELESCOPE, the disclosure of which is hereby specifically incorporated by this reference.

BACKGROUND OF THE INVENTION

The present invention relates generally to position determining apparatus. More particularly, the present invention relates to a system and an associated method for determining positional data associated with a selected target and for transmitting data to the selected target through the use of optical signals.

Many varied types of surveying devices and methods are available to facilitate the collection of data required for mapping and surveying operations.

For instance, U.S. Pat. No. 5,291,262 to Dunne, the inventor of the present application for letters patent, discloses a laser survey instrument operative to determine positional data associated with a selected target. The laser survey instrument generates an infrared laser pulse which is directed upon the target:. Transmission of the laser pulse to the selected target and reflection of the laser pulse back to the survey instrument permits determination of the range between the laser survey instrument and the selected target. The survey instrument also determines vertical and horizontal angles between the survey instrument and the selected target. The horizontal and vertical angles, together with the range between the survey instrument and the target, form positional data which defines the position of the selected target.

Also hand-held laser survey instruments available from Laser Technology, Inc. of 7070 South Tucson Way, Englewood, Colo. 80112, determine range, horizontal angle, and vertical angle values which together form the positional data which define the position of a selected target. The positional data determined by the laser survey instruments may be supplied to a data storage apparatus which records the data collected by the survey instrument.

A HYDRO II (tm) laser survey instrument and system is also available from Laser Technology, Inc. The survey laser determines the range between the survey laser and a selected target. A theodolite determines horizontal and vertical angles between the survey laser and the selected target. Values of the range and of the horizontal and vertical angles are supplied to continuous wave radio circuitry which modulates a continuous wave, radio frequency signal. A modulated radio frequency signal is generated by the radio transmitter for transmission to a remote site. The HYDRO II (tm) survey laser and system is of particular utility in underwater mapping operations. A ship-based sounding device, used to determine water depths, supplies data representative of measured water depths to ship-based data storage apparatus. A ship-based radio receiver receives the modulated signals generated by the radio transmitter of the HYDRO II (tm) survey laser system. The ship-based radio receiver demodulates the received signals, and values of the signals are stored at the ship-based data storage apparatus. By correlating the data determined by the survey laser and system with the data collected by the depth sounding apparatus, underwater mapping is permitted.

Similar survey laser and systems may be utilized in other applications to transmit data collected by the survey laser and system to a remote site.

The existing survey laser and system which transmits the data to a remote site through the generation of a continuous wave, radio frequency signal works well to transmit the data to a remote site. However, in many areas, governmental bodies regulate the transmission of radio frequency signals. In many areas, licensing is required to permit transmission of a radio transmitter. Multiple licenses are sometimes required to be obtained to permit operation of the radio transmitter when the survey laser and system is to be operated in various geographical areas over which various governmental bodies have jurisdiction. Procurement of the necessary licenses to permit operation of the radio transmitter can easily become a bureaucratic burden. Also, radio transmission of information by a continuous wave modulation technique is susceptible to radio frequency interference or frequency drift.

A laser survey instrument capable of collecting data and transmitting the data to a remote site by a transmission mechanism which does not require licensing by a governmental body would be advantageous.

It is with respect to these considerations and other background information relative to survey instruments that the significant improvements of the present invention have evolved.

SUMMARY OF THE INVENTION

The present invention advantageously provides an apparatus, method, and system for determining positional data associated with a selected target and for transmitting the positional data to a remote site. The positional data is modulated to form a digital, optical signal comprised of optical pulses. The optical signal is transmitted to a receiver located at a remote site.

The survey instrument includes a light generative element which generates optical pulses which are transmitted to a selected target. Time periods required for transmission of an optical pulse to the selected target and reflection back to the survey instrument permit a determination to be made of the range between the survey instrument and the selected target. A theodolite, or other angle determining instrument, determines values of horizontal and vertical angles between the survey instrument and the selected target. The range values and the values of the horizontal and vertical angles are modulated upon the optical pulses generated by the light generative element of the survey instrument. The light generative element is used both in the determination of the range to the selected position and also to transmit positional data to the remote site.

The optical signals are transmitted to an optical receiver positioned at a remote site. No licensing is required to permit generation of the optical signals in contrast to the licensing typically required to permit transmission of radio frequency signals. Further, because the survey instrument does not require a radio frequency transmitter, all costs associated with a radio frequency transmitter are avoided. Also, optical signals are not susceptible to radio frequency interference or frequency drift.

An optical signal receiver is positioned at a remote site for receiving transmitted optical signals. Values of the optical signals received by the optical signal receiver are stored in data storage apparatus located at the remote site. Additional data collected at the remote site may also be stored in the optical signal receiver. When the selected target is positioned at the remote site to which the optical signals are to be transmitted, the optical pulses forming the optical signal generated by the light generative device may be used simultaneously to determine range data and also to transmit data to the remote site. That is to say, positional, or other, data measured during a preceding measuring period may be transmitted to the remote site during a subsequent measuring period.

The present invention may be advantageously utilized in hydrographic mapping applications. The survey instrument is positioned at a reference position and determines positional data of a selected target at which a water-based sounding device is positioned. An optical receiver positioned together with the sounding device receives the optical signals generated by the survey instrument and stores values representative of the optical signals and also data collected by the sounding device.

In accordance with the present invention, therefore, an apparatus for determining positional data representative of at least a relative position of a selected target and for transmitting the positional data to a remote site is disclosed. A light generative device generates optical pulses. A position determining device coupled to the light generative device determines the positional data representative of at least the relative position of the selected target. A modulation device is coupled to the light generative device and also to the position determining device to receive the positional data determined by the position determining device. The modulation device modulates the optical pulses generated by the light generative device with the positional signals for transmission to the remote site.

In a further embodiment of the present invention, an optical signal receiver is positioned at the remote site and receives the optical signals formed of the optical pulses generated by the light generative device. A data storage device is further positioned at the remote site for storing values of the optical signals transmitted to the optical receiver. Additional data may also be stored in the data storage device.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
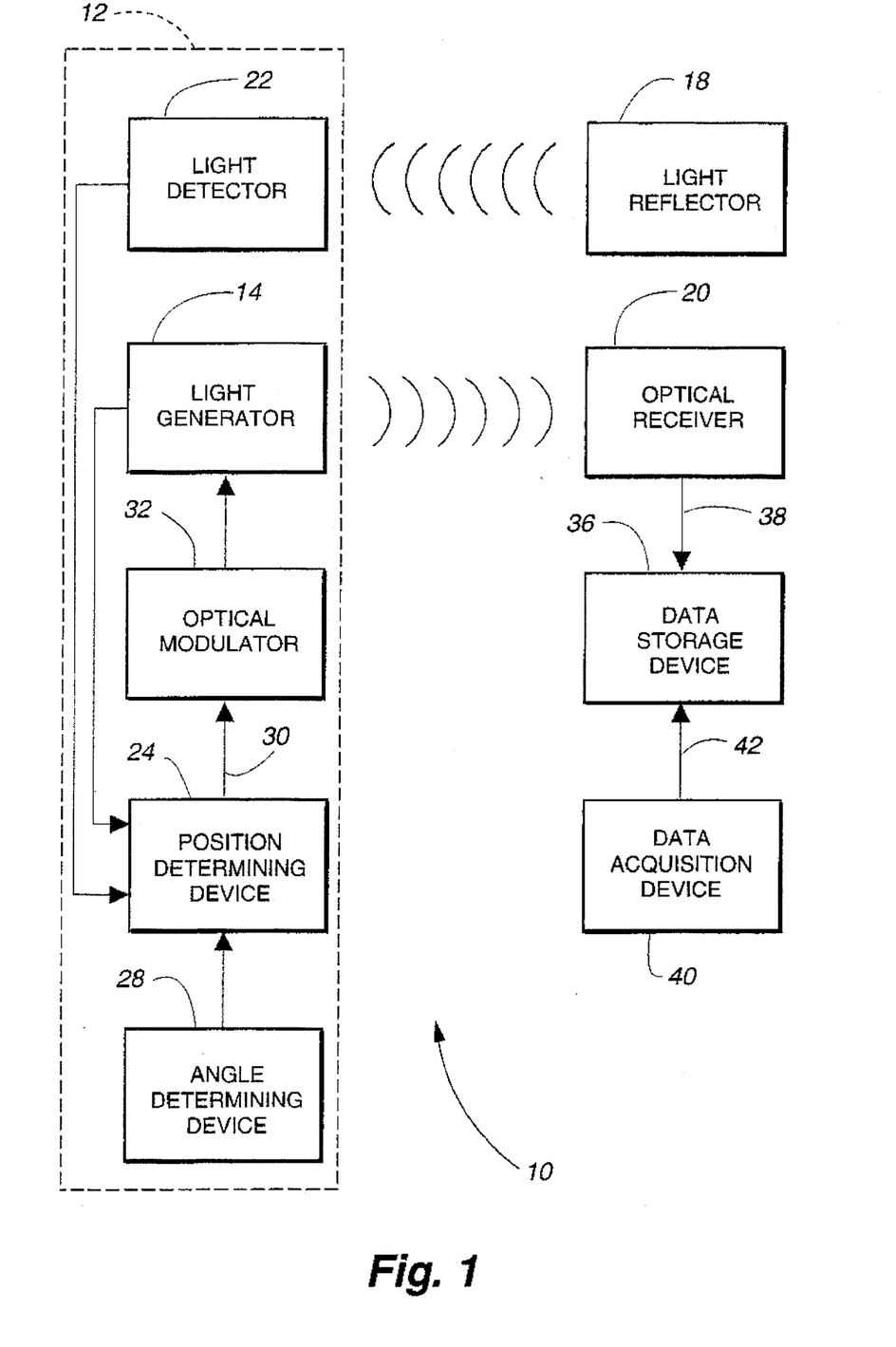
FIG. 1 is a functional block diagram of the system of an embodiment of the present invention.

FIG. 1 illustrates a system, shown generally at 10, of an embodiment of the present invention. The system 10 determines positional data representative of a selected target and transmits the positional data to a remote site. In the illustration of FIG. 1, the selected target and the remote site are commonly located.

The system 10 includes a survey instrument 12, here a laser survey instrument. The survey instrument 12 may alternately be formed of another type of optical light generative survey instrument. The survey instrument 12 includes a laser light generator 14 which generates laser pulses forming optical pulses. The optical pulses generated by the light generator 14 are transmitted to a light reflector 18 and an optical receiver 20, both positioned at the selected target.

The light reflector 18 reflects the optical pulses transmitted thereto back to the survey instrument 12.

The survey instrument 12 also includes a light detecting and processing circuitry 22 for detecting the optical pulses reflected by the light reflector 18. The light detecting and processing circuitry 22 generates signals indicating times when the light detecting and processing circuitry 22 receives the reflected optical pulses, and the signals are applied to a position determining device 24. The position determining device 24 is also coupled to the light generator 14 to be provided with indications of times in which the generator 14 generates optical pulses. The position determining device 24 determines values of the range between the laser survey instrument 12 and the selected target responsive to a determination of time differentials between times in which the light generator 14 generates the optical pulses and the light detecting and processing circuitry 22 receives the reflected optical pulses.

The laser survey instrument 12 also includes an angle determining device 28 which determines horizontal and vertical angles between the laser survey instrument 12 and the selected target. The horizontal and vertical angles determined by the angle determining device are also applied to the position determining device 24.

The position determining device 24 generates positional data on line 30. The positional data includes values of the range and the horizontal and vertical angles between the survey instrument 12 and the selected target. Line 30 is coupled to an optical modulator 32 to permit the optical modulator 32 to receive the positional data generated by the position determining device 24.

The optical modulator 32 modulates the positional data onto the optical pulses by altering the spacing between adjacent ones of the optical pulses generated by the light generator 14. Series of the optical pulses, once modulated with the positional data, form optical signals which are transmitted to the optical receiver 20.

The optical receiver 20 determines the spacings between adjacently positioned pulses of the optical signals transmitted thereto. By appropriate determination of the spacing between the optical pulses of the optical signals transmitted to the optical receiver 20, the optical receiver 20 determines the positional data associated with the selected target. Values of the positional data received by the optical receiver 20 are stored in a data storage device 36, such as a data logger or computer, which is coupled to the optical receiver by the way of line 38.

The system 10 further includes a data acquisition device 40 which acquires the data for storage in the data storage device 36. The data acquisition device 40 and the data storage device 36 are coupled by way of line 42. Data acquired by the data acquisition device 40 is stored in the data storage device 36 together with the positional data received by the receiver 20. Because both positional data transmitted to the optical receiver 20 and the data acquired by the data acquisition device 40 are stored in the data storage device 36, the data acquired by the data acquisition device 40 may be correlated with the positional data transmitted to the optical receiver 20. All of the data required to create, for example, a topographical map may be stored, through operation of the system 10, in the data storage device 36.

The system 10 is of particular utility when the position of the selected target at which the light reflector 18, optical receiver 20, data storage device 36, and data acquisition device 40 changes over time, such as when the elements are ship-based, carried by a vehicle, or carried by an individual to be positioned at different locations. When positioned at the different locations, the data acquisition device 40 acquires data associated with the position at which the elements are located, and the optical receiver 20 receives positional data determined by the laser survey instrument 12 of the position at which the elements are located. The data storage device 36 thereby stores all information necessary to perform mapping, or other types of surveying, operations in which both positional data and additional data acquired by the data acquisition device 40 are utilized.

Figure 2:
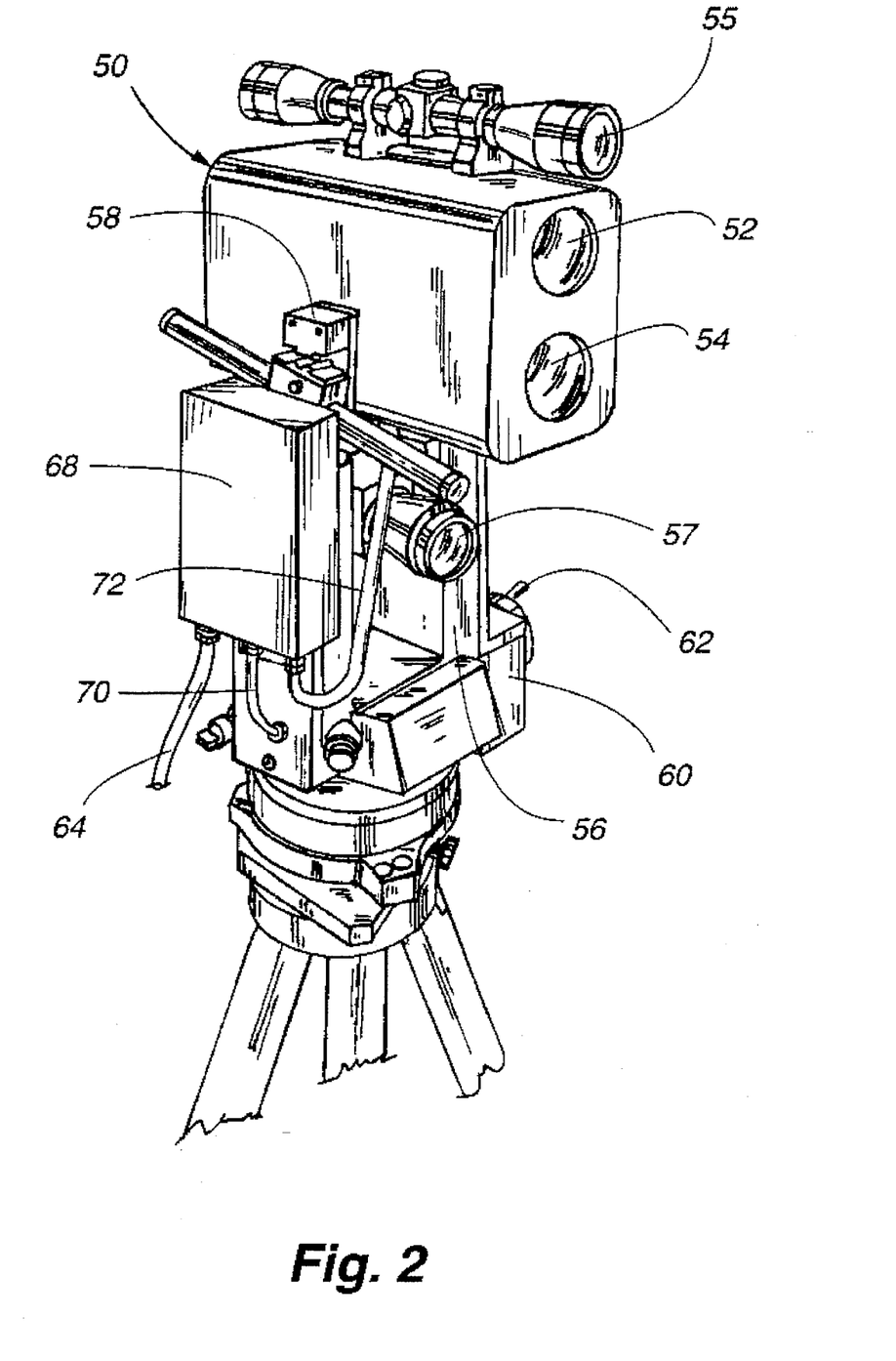
FIG. 2 is a perspective view of a laser survey instrument of an embodiment of the present invention which forms a portion of the system shown in FIG. 1.

FIG. 2 illustrates the laser survey instrument 12 of an embodiment of the present invention. The survey instrument 12 is positioned either at a reference position or at a position in a known relationship with a reference position.

A laser light generator forming the light generator 14 and a laser light receiver forming the light detecting and processing circuitry 22 are housed within a common housing 50. The housing 50 includes light-transmissive portions 52 and 54. The light-transmissive portions 52 and 54 permit the transmission of laser light and reception of reflected laser light by the generator 14 and the circuitry 22, respectively. Circuitry forming the position determining device 24 (shown in FIG. 1) and the modulator 22 (shown in FIG. 1) are also housed within the housing 50. A telescopic sight 55 is mounted upon the housing 50 to permit an operator of the survey instrument 12 to aim the survey instrument 12 at a selected target. Once aimed at the selected target, the operator actuates a manually-actuatable trigger which causes generation of optical pulses by the light generator 14.

The housing 50 is mounted upon a theodolite 56 which forms the angle determining device 40 shown in FIG. 1. The theodolite 56 is operative to determine horizontal and vertical angles between the survey instrument 12 and the selected target and to generate signals of values representative of the angles. The theodolite 56 further includes a sighting mechanism 57 which may be used by an operator of the instrument 12 to aim the survey instrument 12 at a selected target in the alternative to use of the sight 55.

The housing 50 is mounted upon the theodolite 56 in a manner which permits limited tilting movement of the housing 50, and the light generator and detector 14 and 22 housed within the housing 50, relative to the theodolite 56 through suitable actuation of a tilting mechanism 58. And, rotation of the theodolite 56 and the housing 50 is permitted by way of actuation of an endless tangent mechanism 60. The endless tangent mechanism is manually actuated by way of rotation of an actuation lever 62.

A power cable 64 supplies the survey instrument 12 with a suitable supply of power, such as that which might be supplied by a 12 volt dc power pack. The power cable 64 is coupled to an interface 68. The interface 68 is also coupled to the theodolite 56 by way of a cable 70 upon which signals representative of the vertical and horizontal angles determined by the theodolite 56 are generated. The interface 68 is further coupled to the circuitry housed within the housing 50 by way of a cable 72. The cable 72 includes lines to supply power to the circuitry housed within the housing 50 as well as signals representative of the horizontal and vertical angles determined by the theodolite 56. Circuitry forming the position determining device 24 and the optical modulator 32 are operative in manners described previously to control the spacing between the optical pulses generated by the light generator 14.

Figure 3:
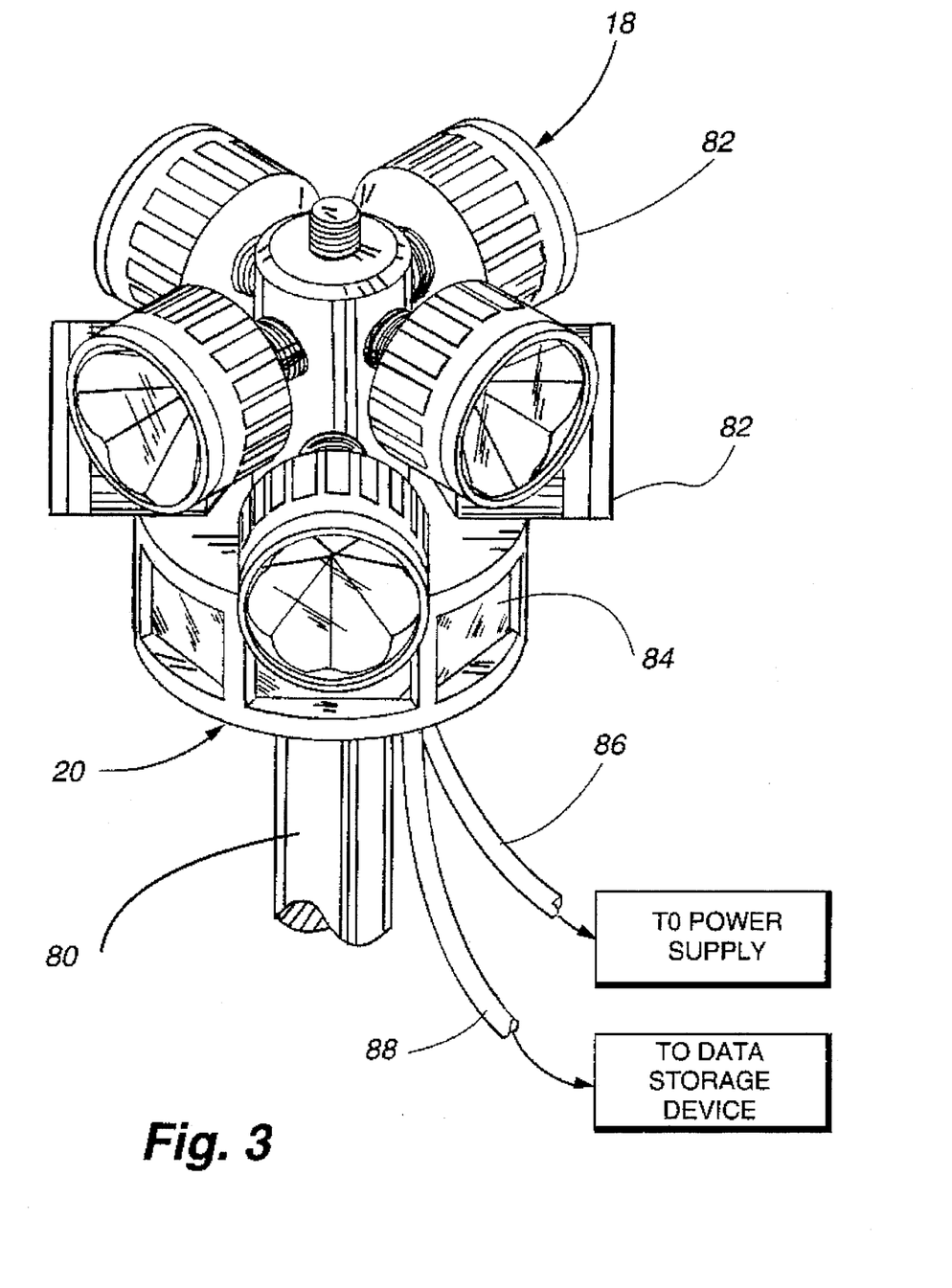
FIG. 3 is a perspective view of an optical receiver which forms a portion of the system shown in FIG. 1.

FIG. 3 illustrates the light reflector 18 and the optical receiver 20 positioned at the selected target. The reflector 18 and the receiver 20 are supported about a central staff 80 which is supported to extend above an appropriate support surface. The reflector 18 is formed of a plurality, here eight, outwardly-facing and radially-positioned prisms or retroreflectors 82. The prisms 82 are supported from the shaft 80 at either of two vertical heights wherein the prisms 82 supported at a first of the two vertical heights are radially offset from the prisms 82 supported at the second of the two vertical heights and form two rings of prisms 82. The prisms 82 are positioned such that at least one of the prisms 82 is positioned to face the laser survey instrument 12 (shown in FIG. 1) irrespective of the orientation of the reflector 18 relative to the survey instrument 12. Use of the reflector 18 increases the range of operability of the survey instrument 12 by forming high efficiency reflectors for reflecting light transmitted thereto by the survey instrument 12.

The optical receiver 20 is formed of a plurality of optical detectors 84 for converting light energy into electrical signals. Each of the optical detectors 84 is coupled to receiver circuitry and the optical receiver 20 is here preferably formed of a plurality of discrete receivers, each associated with a particular optical detector 84. The optical detectors 84, similar to the prisms 82 are outwardly facing and radially positioned about the central staff 80 to form a ring of optical detectors 84. At least one of the optical detectors 84 is positioned to receive the optical pulses generated by the laser survey instrument 12 (shown in FIG. 1) irrespective of the orientation of the receiver 20 relative to the survey instrument 12. The optical receiver 20 is powered by an appropriate power supply by way of a cable 86, and electrical signals generated by the receiver 20 are provided to the data storage device 36 (shown in FIG. 1) by way of the cable 88.

Figure 4:
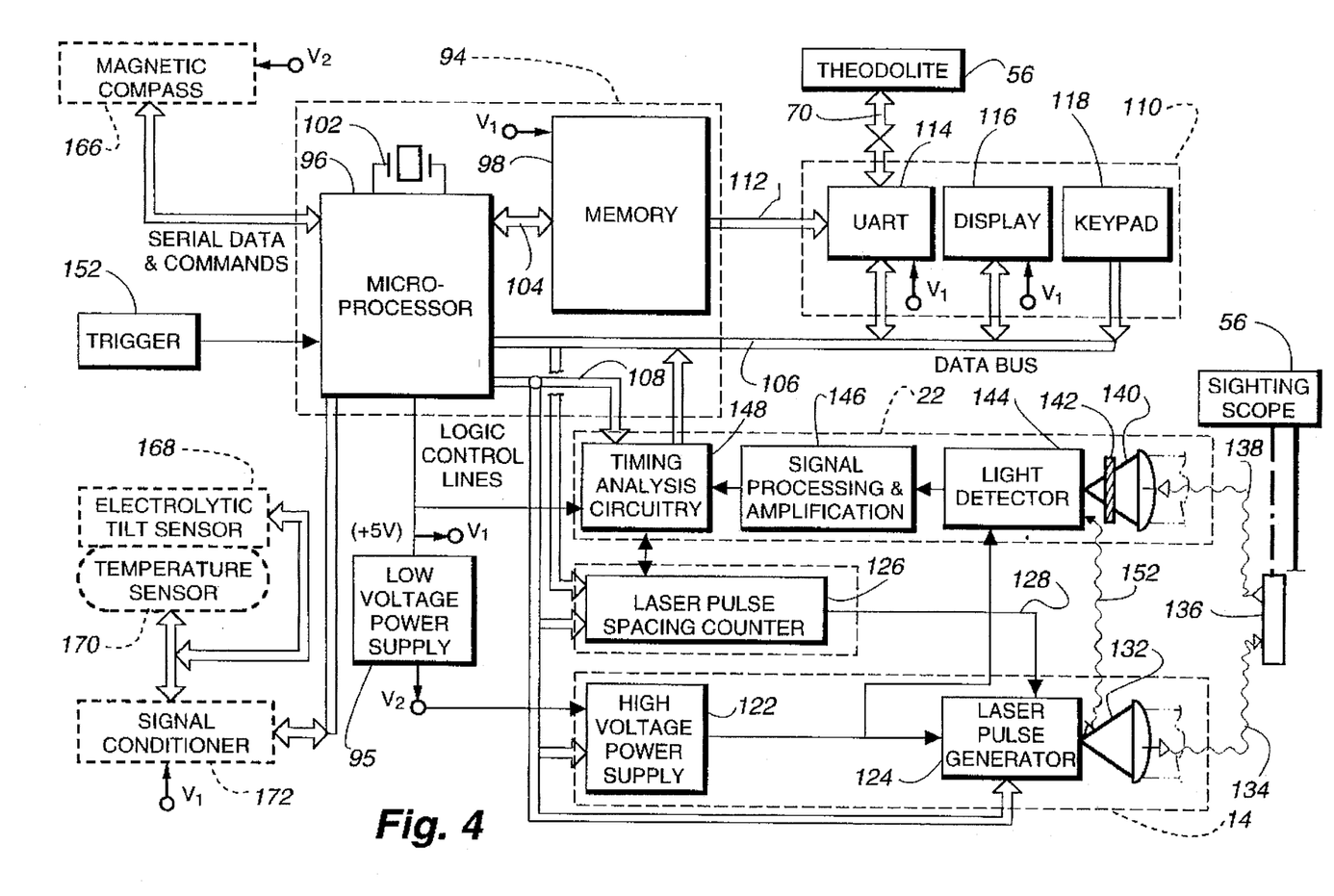
FIG. 4 is a functional block diagram of the laser survey instrument shown in FIG. 2.

The circuitry of the laser survey instrument 12 is shown in FIG. 4. The laser survey instrument 12 is similar to corresponding structure disclosed in U.S. Pat. No. 5,291,262 and the contents thereof are incorporated herein by reference. The laser survey instrument 12, in contrast to the structure disclosed in U.S. Pat. No. 5,291,262, further includes circuitry for controlling the spacing between the adjacent optical pulses generated by the survey instrument.

The survey instrument 12 includes a microcontroller 94 having a microprocessor 96, a memory unit 98 and an oscillator 102. The elements of the microcontroller 94 are appropriately powered by connection to a low voltage power supply 95. The power supply 95 also powers other elements of the survey instrument 12. The microprocessor 96 and the memory unit 98 are interconnected by way of a bus 104, and the microprocessor 96 is coupled to other circuitry of the survey instrument 12 by way of a data bus 106. The processor 96 is also coupled to other circuitry of the survey instrument 12 by way of logic control lines 108.

The memory unit 98 is coupled to data input/output circuitry 110 by way of a bus 112. The data input/output circuitry includes a UART 114, a visual display 116, and a keypad 118. The UART 114, display 116, and keypad 118 are further coupled to the data bus 106. The theodolite 56 which determines the horizontal and vertical angles between the survey instrument 12 and a selected target is coupled to the UART 114 by way of the cable 70 (also shown in FIG. 2). Values of the horizontal and vertical angles determined by the theodolite 56 are supplied to the microcontroller 94 by way of the UART 114.

The logic control lines 108 extending from the processor 96 are also coupled both to the light detecting and processing circuitry 22 and to the light generator 14.

More particularly, the light generator 14 includes a high voltage power supply 122, and the logic control lines 108 are coupled to the power supply 122 of the light generator 14. The high voltage power supply 122 is, in turn, coupled to a laser pulse generator 124. The logic control lines 108 are also coupled to the laser pulse generator 124. The laser pulse generator 124 is further coupled to a laser pulse spacing counter 126 by way of line 128. The laser pulse spacing counter 126 forms the optical modulator 32 of the survey instrument 12 and is coupled to the data bus 106 and also to the logic control lines 108. The laser pulse spacing counter is controlled by the microprocessor 96 which loads the counter 126 with count values. When the counter 126 counts out, signals generated on line 128 permit generation of an optical pulse by the pulse generator 124. It should also be noted that, while the laser pulse spacing counter 126 is illustrated functionally in FIG. 4 as a discrete element, the counter 126 may alternately be integrated into the microprocessor 96.

The laser pulse generator 124 generates optical pulses which are transmitted through a collimator 132. The optical pulses are indicated by the waveform 134 in the figure for transmission to a selected target 136. Reflected pulses, here indicated by waveform 138, are received by the light detecting and processing circuitry 22. The light detecting and processing circuitry 22 includes a collimator 140, a filter 142, a light detector 144, signal processing and amplification circuitry 146, and timing analysis circuitry 148. The timing analysis circuitry is coupled both to the data bus 106 and to the logic control lines 108.

The high voltage power supply 122 of the light generator 14 is further coupled to the light detector 144 of the light detecting and processing circuitry 22, and the light detector 144 is further operative to receive a redirected portion of the optical pulses generated by the laser pulse generator 124, here represented by the waveform 152. The redirected portion of the optical pulses generated by the generator 124 is used to form a timing reference signal. The redirected portion forms reference pulses.

The light generator 14 and light detecting and processing circuitry 22 generate and receive optical pulses to permit determination of the range between the survey instrument 12 and the selected target 136 from which the optical pulses are reflected. Optical pulses reflected from the selected target 136 are filtered by the filter 142. The filter 142 passes signals of wavelengths corresponding to the frequency of the optical pulses generated by the pulse generator 124. The filter 142 is preferably a narrow band interference filter.

Operation of the light generator 14 and the light detecting and processing circuitry 22 is controlled by operation of the microcontroller 94 by way of the logic control lines 108. An operator initiates operation of the survey instrument 12 by appropriate actuation of a manually-actuatable trigger 152. In one embodiment of the present invention, operation of the survey instrument can also be initiated through a device coupled to the input/output circuitry 110.

The microcontroller 94 determines the value of the range between the survey instrument 12 and the selected target 136 by determining the amount of time required to transmit the optical pulses to the selected target 136 and to receive reflected optical pulses reflected therefrom. The microcontroller 94 is also coupled to receive values of the horizontal and vertical angles determined by the theodolite 58 by way of the UART 114. The values of the horizontal and vertical angles together with the value of the range to the selected target form the positional data representative of the position of the selected target relative to the survey instrument 12.

Responsive to the values of the positional data, the microcontroller 94 causes the laser pulse spacing counter 126 to be preset with a selected count value. When the counter 126 counts out to the selected count value, signals generated on line 128 permit the generation of optical pulses by the laser pulse generator 124. The optical pulses generated by the pulse generator 124 are thereby spaced apart by intervals corresponding to the values of the positional data determined during operation of the survey instrument 12. The optical pulses generated during operation of the survey instrument 12 thereby are used both to determine the positional data representative of a selected target and also to transmit the positional data to a remote site.

In a further embodiment of the present invention, additional, or other, data may be transmitted by the survey instrument 12. This additional or other data may, for instance, be manually entered by way of the keypad 118 or through an external device appropriately connected to the survey instrument 12.

FIG. 4 further illustrates a magnetic compass 166, all electrolytic tilt sensor 168, a temperature sellsor 170, and a signal conditioner 172, all shown in dash. The elements 166–172 form a portion of the survey instrument 12 in an alternate embodiment of the present invention. The elements 166–172 can be substituted for the theodolite 56 and are operative to determine values of the horizontal and vertical angles between the instrument 12 and the selected target 136. As the elements 166–172 may be housed within the housing 50 (shown in FIG. 2) of the survey instrument 12, use of an embodiment including the elements 166–172 in substitution for the theodolite 56 may be desirable when the survey instrument 12 must be portable or form a hand-held device.

Figure 5:
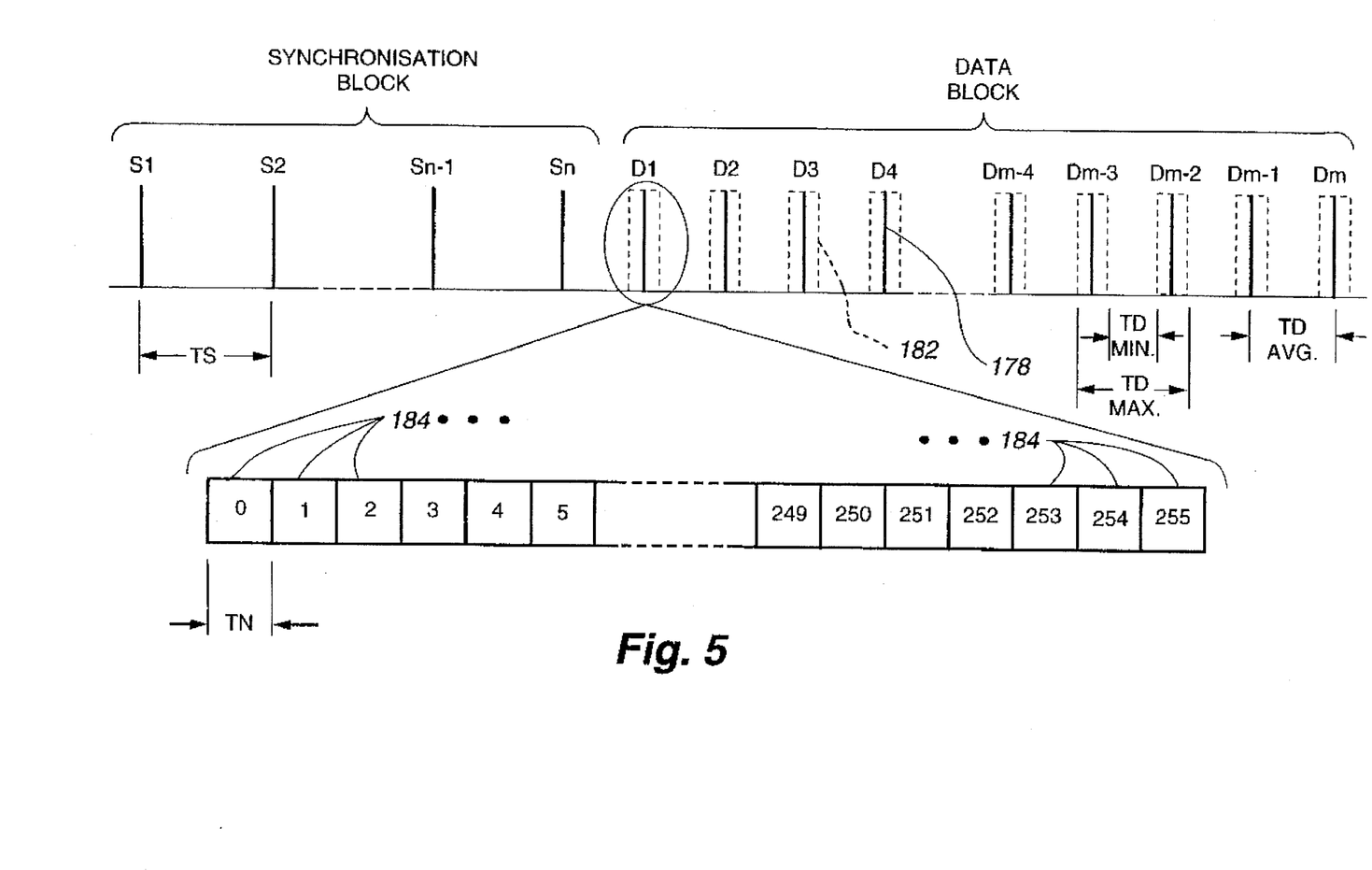
FIG. 5 is a timing diagram illustrating an optical signal generated by the laser survey instrument of an embodiment of the present invention and an enlarged portion which illustrates time slots in which an optical pulse of the optical signal may be generated.

FIG. 5 illustrates the timing characteristics of an optical signal generated by an exemplary embodiment of the present invention. As the positional data determined by the survey instrument 12 is determinative of the time spacing between adjacent optical pulses, identified in the figure by the reference numeral 178, the optical signal forms a pulse position modulated signal.

The average rate at which the optical pulses are generated is selected to ensure that the maximum allowable average energy levels permitted of light generated by a Class I laser device are not exceeded. More particularly, here, the average rate at which the optical pulses are generated is selected to correspond to an average spacing between adjacent optical pulses of 6,000 microseconds.

As the operating range of the survey instrument 12 is approximately 100,000 feet, transmission of an optical pulse to a selected target at a distance of the 100,000 feet and reflection of the pulse back to the survey instrument 12 requires approximately 200 microseconds. The average spacing of the 6,000 microseconds between the optical pulses is therefore much greater than the time required to transmit an optical pulse to, and to receive an optical pulse reflected from, a selected target.

The optical signal preferably includes a synchronization block and a data block. Optical pulses of the synchronization block, shown at the left-hand side portion of FIG. 5, are utilized to synchronize the circuitry of the optical receiver 20 with the circuitry of the survey instrument 12. The positional data determined by the survey instrument 12 is contained in the data block, shown at the right-hand side portion of FIG. 5, of the optical signal.

The average spacing between optical pulses is indicated in the figure by the designation TD AVG. While the average spacing between the pulses is 6,000 microseconds, the spacing between any two adjacent pulses is quite likely to differ, and the spacing between the adjacent pulses can be of any value between a minimum value, designated by TD MIN in the figure, and a maximum value, designated by TD MAX in the figure. An optical pulse 178 may be generated at any time within a time period identified by the blocks 182, shown in dash, positioned about each of the pulses 178.

In the embodiment illustrated in FIG. 5, the optical pulses are of pulse widths of fifteen nanoseconds. The pulses are generated within time slots which are defined to be of six microsecond time periods. The time period of the time slots is designated by TN in the figure. Two hundred fifty-six, i.e., $2^8$, time slots 184 are defined in the enlarged portion of FIG. 5. An optical pulse of the fifteen nanosecond duration can be generated in a selected slot 184. As the fifteen nanosecond optical pulse can be generated in any one of 256 different time slots, the minimum spacing between adjacent optical pulses is 4,464 microseconds (6,000 microseconds minus 1,536 microseconds), and the maximum time difference between adjacent optical pulses is 7,536 microseconds (6,000 microseconds plus 1,536 microseconds).

Because of the 256 different time slots in which an optical pulse may be generated, eight bits of data can be transmitted with each succeeding optical pulse. In the example of FIG. 5, the data block is formed of thirty optical pulses (i.e., m=30), and the spacing between each adjacent pulse of the thirty optical pulses defines eight bits of data. It has been determined that transmission of data blocks comprised of thirty pulses, each of which transmits eight bits of data, permits transmission of the positional data required to identify the position of a selected target. Selection of other timing and modulation schemes can permit other amounts of data to be transmitted.

Optical pulses of the synchronization block are spaced apart by time spacings of 7,600 microseconds, indicated in the figure by the designation TS. An optical receiver receiving the optical pulses spaced apart by 7,600 microseconds interprets the spaced-apart pulses to form the synchronization block. When the spacing between optical pulses is less than 7,600 microseconds, the optical receiver determines the informational content of the optical signal.

The timing scheme illustrated in FIG. 5 is exemplary only. Other timing schemes by which the positional data may be modulated to form optical signals to transmit the optical signals to a remote site are, of course, also possible. And, as noted above, additional or other data may be transmitted in similar fashion. The timing scheme described above permits transmission of desired amounts of data to a remote site while ensuring that maximum allowable energy levels of laser light transmission are not exceeded. As multiple bits of data, here eight bits of data, are transmitted with each succeeding optical pulse, efficient transfer of data is permitted.

As the time spacing between pulses is very large relative to the widths of the pulses, the receiver 20 which receives the pulses is permitted to be operated over a broad range of incident optical pulse power.

Figure 6:
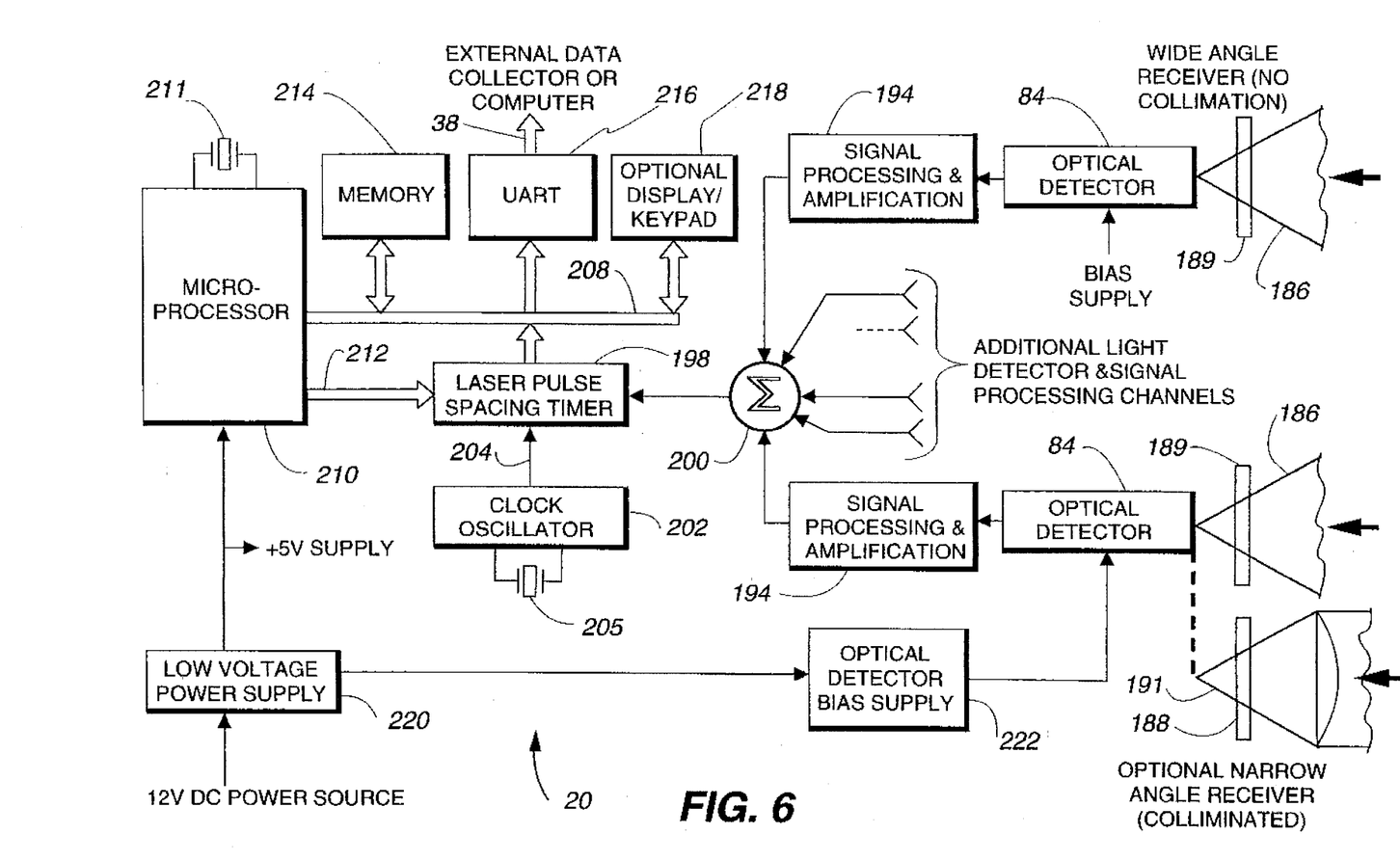
FIG. 6 is a functional block diagram of a portion of the optical signal receiver shown in FIG. 3.

FIG. 6 illustrates a portion of the optical receiver 20 which receives the optical signals generated by the laser survey instrument 12. As mentioned previously, the optical receiver includes a plurality of optical detectors 84. Each of the detectors 84 is here shown to receive the optical pulses by way of wide angle receiver 186 or, alternately, by way of a narrow angle receiver 188. A single narrow angle receiver is shown, for purposes of illustration, in FIG. 6, connectable to the bottom-most, as shown, optical detector 84. Use of the narrow angle receiver 188 increases the range of operability of the system 10. Absorbtion filters 189 filter the optical pulses received by the wide angle receivers 186 and narrowband interference filters 191 filter the optical pulses received by the narrow angle receivers 188. When the pulses forming the optical signals are received and detected by one or more light detectors 82, the affected light detector 82 converts the optical pulse into an electrical signal for application to a signal processing and amplification circuit 194 associated with each of the plurality of light detectors 82. Each of the signal processing and amplification circuits 194 is coupled to a laser pulse spacing timer 198 through a summer 200. The timer 198 also receives a clock signal generated by a clock oscillator 202 on line 204. The clock oscillator is coupled to a crystal 205. While more than one light detector 82 may simultaneously detect optical pulses of the optical signal transmitted thereto, the signals generated by the light detectors 82 which detect the optical pulses are identical, and the signal generated by the summer 200 corresponds to the signal generated by any of the circuits 194 to which an optical pulse received by an associated optical detector 84 is received. That is to say, here, the summer 200 functions in a manner equivalent to the functioning of a logical-OR gate.

The laser pulse spacing timer 198 determines the time intervals between adjacent optical pulses detected by the one of more the optical detectors 84 and generates signals indicative thereof upon a data bus 208 which is coupled to a microprocessor 210. The laser pulse spacing timer 198 functions as a demodulator to demodulate signals representative of the optical signals received by the detectors 84. Responsive to the signals generated by the timer 198, the microprocessor 210 determines the positional data transmitted to the receiver. It should also be noted that, while the timer 198 is illustrated functionally in the figure as a discrete element, the timer 198 may alternately be integrated into the microprocessor 210. The microprocessor is coupled to a crystal 211. The microprocessor 210 also generates signals on the data bus 208 and also logic control lines 212 which are coupled to the laser pulse spacing timer 198.

A memory element 214, a UART 216, and a display element/keypad input 218 are further coupled to the microprocessor, all to be in communication with the microprocessor 210. The UART 216 permits connection of the receiver 20 to the data storage device 36, shown in FIG. 1.

The receiver 20 further includes a low voltage power supply 220 and an optical detector bias supply 222. The power supply 220 powers most of the circuitry of the receiver 20 while the optical detector bias supply powers the optical detectors 84 which are comprised, for example, of PIN diodes.

The microprocessor 210 of the receiver 20 determines the positional data transmitted to the receiver 20 responsive to the determined intervals between the adjacent pulses of the optical signal.

Figure 7:
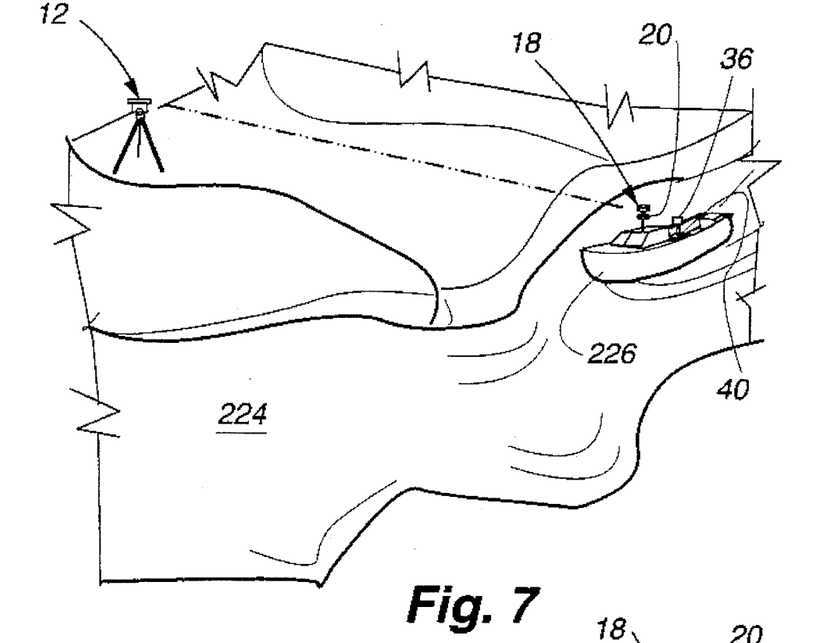
FIG. 7 is a perspective view of the system shown in FIG. 1 utilized to map a body of water.

FIG. 7 illustrates a hydrographic application of the system 10 of an embodiment of the present invention. Here, the system 10 is utilized to map a body of water 224. The laser survey instrument 12 is positioned at a reference position, and a light reflector 18 and an optical receiver 20 are mounted upon a floating vessel 226. The survey instrument 12 determines the position of the floating vessel 226 and transmits at least positional data representative of the position of the floating vessel 226 to the optical receiver 20. The positional data received by the optical receiver 20 is stored in the data storage device 36. The data acquisition device 40, here a depth sounder, determines the water depth of the body of water 224 directly beneath the floating vessel 226 and the data acquired by the depth sounder is stored in the data storage device 36. All of the data required to map the body of water 224 is thereby stored in the data storage device 36. Appropriate utilization of the data stored in the storage device 36 permits a map to be made of the body of water 224.

This hydrographic application of the system 10 is of particular utility in dredging operations. The system 10 may be utilized to perform mapping operations and the dredging operations are performed responsive to the mapping of the body of water. After the dredging operations have been performed, mapping operations may again be performed to ensure that the dredging operations have been adequately performed.

Figure 8:
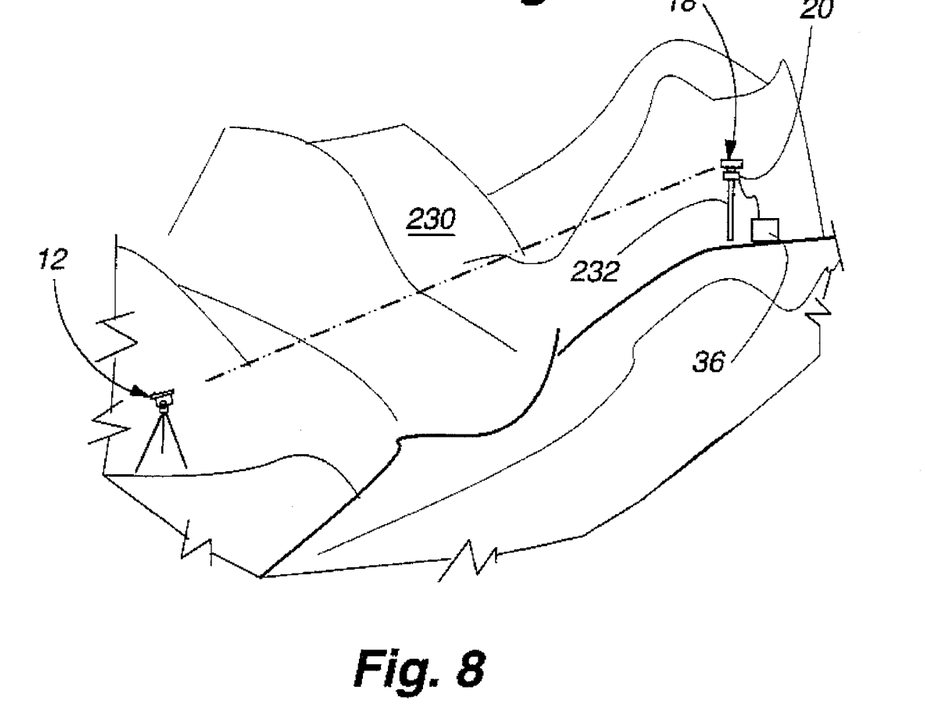
FIG. 8 is a perspective view of the system shown in FIG. 1 utilized to map a plot of land.

FIG. 8 illustrates another application of the system 10 of an embodiment of the present invention. Here, the system 10 is utilized to map an area of land 230. The laser survey instrument 12 is positioned at a reference position, and a light reflector 18 and an optical receiver 20 are supported by a shaft member 232. Here, the light reflector 18 may be formed of a single prism 82 and the optical receiver 20 may be comprised of a single optical detector 84. A person carrying the shaft member 232 orients the reflector 18 and the receiver 20 relative to the survey instrument 12 to receive the optical pulses generated by the survey instrument 12. Positional data transmitted to the receiver 20 is stored in a data storage device 36. The data storage device 36 here preferably also permits manual entry of data, and the manually-entered data may be correlated with the positional data transmitted to the receiver 20.

Because the positional data determined by the survey instruments 12 is utilized to form an optical signal which is transmitted to a remote site, an operator of the survey instrument 12 need not obtain a radio license to transmit the positional data to a remote site. By suitable selection of the modulation scheme by which the positional data is modulated to form the optical signal, the energy level of the optical signals generated by the survey instrument 12 are within prescribed maximum energy levels permitted of Class I laser operation. Also, the same optical pulses utilized to determine the range between the survey instrument 12 and a selected target can be used to transmit positional data to the selected target. A single light generator 14 may thereby be utilized both in the determination of positional data and also to transmit positional data to the selected target.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

I claim:

1. An apparatus for determining positional data representative of at least a relative position of a selected target and for transmitting the positional data to a remote site, said apparatus comprising:

a light generative device for generating optical pulses for transmission to the selected target;

a position determining device coupled to said light generative device, said position determining device for determining the positional data representative of at least the relative position of the selected target responsive to reflections of the optical pulses from the selected target; and a modulation device coupled to said light generative element and coupled to receive the positional data determined by said position determining device, said modulation device for modulating the optical pulses generated by said light generative element with the positional data to form optical signals of the optical pulses for transmission to the remote site.

2. The apparatus of claim 1 wherein said light generative device and said position determining device together comprise a laser measuring instrument for determining range values between the position determining device and the selected target.

3. The apparatus of claim 2 wherein said position determining device further comprises reflectors positioned at the selected target for reflecting the optical pulses transmitted thereto.

4. The apparatus of claim 2 wherein said position determining device further comprises an angle determining device for determining horizontal and vertical angles between the position determining device and the selected target.

5. The apparatus of claim 2 wherein the optical pulses generated by said light generative device are utilized simultaneously for determining the range values and for forming the optical signals for transmission to the remote site.

6. The apparatus of claim 1 wherein the selected target is located at the remote site.

7. The apparatus of claim 1 wherein said modulation device modulates the optical pulses to form a pulse position modulated signal.

8. The apparatus of claim 7 wherein spacings between adjacent ones of the optical pulses forming the pulse position modulated signal define multiple bits of data.

9. The apparatus of claim 1 wherein said modulation device comprises a counting device set to selected count values, said counting device for enabling generation of the optical pulses by said light generative device when the counting device counts out to the selected count values.

10. The apparatus of claim 1 further comprising, in combination:

at least one optical signal receiver positioned at the remote site for receiving the optical signals transmitted thereto.

11. The apparatus of claim 10 wherein said at least one optical signal receiver comprises a plurality of spaced-apart, circumferentially-positioned optical receivers, each of said optical receivers for receiving the optical signals and for converting the optical signals into electrical signals.

12. The apparatus of claim 10 further comprising, in combination:

a data storage device coupled to at least one optical receiver, said data storage device for storing values of the electrical signals generated by said at least one optical receiver.

13. The apparatus of claim 12 further comprising, in combination:

a data acquisition device coupled to said data storage device, said data acquisition device for acquiring data related to selected features and for generating acquired data signals having values representative of the data acquired thereat.

14. The apparatus of claim 13 wherein said data storage device is further operative to process the acquired data signals generated by said data acquisition device and to store values of the acquired data signals.

15. A system for determining positional data transmitting the positional data to a selected position, said system comprising:

a light generative device for generating optical pulses for transmission to the selected position;

a position determining device coupled to said light generative device, said position determining device for determining the positional data representative of at least the relative position of the selected target; and a modulation device coupled to said light generative element and coupled to said position determining device, said modulation device for modulating the optical pulses generated by said light generative element with the positional data to form optical signals via positioning of the optical pulses; and an optical signal receiver positioned at remote site, said optical signal receiver for receiving the optical signals formed of the optical pulses transmitted to the remote site.

16. A method for determining positional data representative of at least a relative position of a selected target and for transmitting the positional data to a remote site, said method comprising the steps of:

generating optical pulses for transmission to the selected target;

determining the positional data representative of at least the relative position of the selected target responsive to the optical pulses generated during said step of generating the optical pulses;

modulating the optical pulses generated during said step of generating the optical pulses with the positional data determined during said step of determining, thereby to form optical signals of the optical pulses for transmission to the remote site.

17. The method of claim 16 comprising the further step of storing values of the optical signals transmitted to the optical receiver.

18. A hydrographic charting system for charting a body of water, said hydrographic charting system comprising:

a light generative device located at a reference position, said light generative device for generating optical pulses for transmission to a selected target located on the body of water;

a position determining device coupled to said light generative device, said position determining device for determining positional data representative of distances separating the reference position and the selected target;

a modulation device coupled to said light generative element and to said position determining device, said modulation device for modulating the optical pulses generated by said light generative element with the positional data determined by said position determining device to form optical signals of the optical pulses for transmission to the selected target;

an optical signal receiving device positioned at the selected target, said optical signal receiving device for receiving the optical signals formed of the optical pulses;

a data storage device coupled to said optical signal receiving device, said data storage device for processing signals representative of the signals received by said optical signal receiving device and for storing values representative thereof; and a depth sounding device coupled to said data storage device and positioned at the selected target, said depth sounding device for determining water depths of the body of water beneath the selected target and for generating signals having values representative of water depths at the selected target for application to said data storage device for storage therein.

19. A receiver for receiving positional data modulated to form pulse position modulated signals formed of optical pulses, said receiver comprising:

at least one optical detector for detecting the optical pulses and for generating electrical signals representative of the optical pulses;

a demodulation device coupled to receive the electrical signals generated by said at least one optical detector, said demodulation device for determining spacings between adjacently-positioned optical pulses of the modulated signals and for generating timing signals of values responsive to the spacings between the adjacently-positioned optical pulses; and a data determining device coupled to receive the timing signals generated by said demodulation device, said data determining device for determining the positional data responsive to values of the timing signals; and a data storage device coupled to said data determining device for storing said positional data.

20. The receiver of claim 19 including:

a display device coupled to said data determining device for displaying said positional data.

* * * * *